United States Patent [19]

Bird et al.

[11] 4,285,049
[45] Aug. 18, 1981

[54] APPARATUS AND METHOD FOR SELECTING FINITE SUCCESS STATES BY INDEXING

[75] Inventors: Richard M. Bird, Woodland Hills; Ju C. Tu, Canoga Park, both of Calif.

[73] Assignee: Operating Systems, Inc., Woodland Hills, Calif.

[21] Appl. No.: 950,326

[22] Filed: Oct. 11, 1978

[51] Int. Cl.³ .............................................. G06F 7/04
[52] U.S. Cl. .................................................... 364/900
[58] Field of Search ... 364/200 MS File, 900 MS File

[56] References Cited

U.S. PATENT DOCUMENTS

| | | | |
|---|---|---|---|
| 3,350,695 | 10/1967 | Kaufman et al. | 364/900 |
| 3,387,274 | 6/1968 | Davis | 364/200 |
| 3,430,205 | 2/1969 | Seeber et al. | 364/900 |
| 3,440,617 | 4/1969 | Lesti et al. | 364/900 |
| 3,568,155 | 3/1971 | Abraham et al. | 364/900 |
| 3,618,027 | 11/1971 | Feng | 364/900 |
| 3,715,730 | 2/1973 | Smith et al. | 364/200 |
| 3,742,460 | 6/1973 | Englund | 364/200 |
| 3,771,139 | 11/1973 | Digby | 364/200 |
| 4,064,489 | 12/1977 | Babb | 364/200 |
| 4,099,242 | 7/1978 | Houston et al. | 364/200 |
| 4,118,788 | 10/1978 | Roberts | 364/900 |
| 4,164,025 | 8/1979 | Dubnowski et al. | 364/900 |

OTHER PUBLICATIONS

Bullen, Jr. et al., "Microtext—The Design of a Microprogrammed Finite State Search Machine for Full-Text Retrieval", in *Fall Joint Computer Conference 1972*, pp. 479-488.

*Primary Examiner*—Harvey E. Springborn
*Attorney, Agent, or Firm*—Charlton M. Lewis

[57] ABSTRACT

A finite state automaton (FSA) may be used to search a stream of input digital code data representing patterns such as text characters, for example, to identify a plurality of designated query words. When a particular one of the sought values of a character or other code element is identified in the input stream, the proper next state for the FSA is typically selected with the aid of a control table memory with multiple entries for each state. According to the invention, the portion of that memory associated with each multiple exit decision state typically consists of only a single word which contains a base state number and a group of indexing bits, one bit for each possible input code element configuration, with set bits corresponding to the multiple values being sought when the FSA is in that particular state. In response to an input code element value that represents a success, an index number is generated from that value and the set indexing bits. That index number is then combined with the base state number to produce the identity of the next success state. The number of indexing bits is reduced for certain codes, such as those representing text characters, by separating the normal elements of the input code into smaller elements, called "nibbles," thereby limiting the number of different input code configurations that must be processed by the FSA in any one state.

2 Claims, 4 Drawing Figures

APPARATUS AND METHOD FOR SELECTING FINITE SUCCESS STATES BY INDEXING

BACKGROUND OF THE INVENTION

This invention is concerned with Finite State Automata (FSA's) that are responsive to a stream of input code data. An FSA is a device which is said to exist in a single state at any given instant, and makes transition, or "steps," from state to state under control of tables stored within the FSA as the input codes are received.

In many applications of FSA's, such as in text searching, when the FSA is in a given state, there may or may not be a multiplicity of possible success states to which transitions are possible in response to respective sought values of the input code, as well as default states, to which transition is made in response to other input code values. In general, the data stored within the control table associated with the given state have been required to identify all such possible transition states, and the input code values which would cause a transition to each such state.

As a result of these requirements, the amount of memory hardware for control table storage is of concern in any FSA implementation. The exact method of implementation can affect the amount of memory required.

One possible scheme is described in the article by R. H. Bullen, Jr. and J. K. Millen entitled "Microtext—The design of a microprogrammed finite state search machine for full-text retrieval," AFIPS Conference Proceeding, Fall Joint Computer Conference, 1972, pp. 479-488. Basically that scheme involves a table of decision data stored for each state. Each table entry includes a particular code element value against which an incoming code element is compared, plus search displacement increments, and a next state address. As an input code element is compared against the stored request or query code value, depending upon whether they are equal, or which is greater, the FSA can take one of three actions: go to the next state, or continue to search the present state table in either the plus or minus direction until a stored query code value does match the incoming code value, using the displacement increments to simplify the search.

That prior art system illustrates the ability of the finite state approach to provide flexible sequential action of the search mechanism in searching a character string, for example. If the search request includes many query words which are to be sought simultaneously, a specific initial task of the FSA is clearly to search the input string for every character that is an initial character of one of the query words. Hence, an initial state of the FSA is typically one in which the associated section of the control table contains a distinct entry for each such initial character. Each entry identifies the particular initial character, and also identifies the next state to which the FSA is to make transition if and when that initial character is found in the input data stream.

When under control of the table section for such a multiple exit state, the FSA described in the Bullen et al article effectively compares the current input character of the data stream sequentially with each of the "significant," or query, characters stored in the respective table entries associated with the current state. If one of those entries yields a match, the FSA makes transition to the success state designated in that table entry. The FSA thus comes under control of the table section associated with that next state. That table section will identify the respective second characters of all query words whose initial character has just been found. If there is only one such query word, the table section typically has only a single significant entry.

Thus, a simple change of state can radically alter the function of the basic search mechanism. In one state that mechanism searches the input data stream for a set of many designated characters that are initial characters of different query words. In the next state, depending upon the result of the first search, it may search for a single designated character that is the second character of a selected one of those query words.

However, the approach described in the cited article is time consuming due to the multiple tries against each state table, and is expensive of memory due to the multiple entry table associated with each state.

The subject of this disclosure provides a more practical solution to the multiple exit state requirement, making the FSA concept much more usable to a wider range of applications.

BRIEF SUMMARY OF THE INVENTION

The invention concerns transitions of an FSA from a "decision state," which is associated with a plurality of alternative success states corresponding to respective success values of a stream of input digital code elements. More particularly, the invention provides an improved method and apparatus for identifying the proper success state to which the FSA should make transition in response to an input digital code element having a particular one of the success values.

In accordance with the invention, the control table entry associated with a decision state typically consists of a single state word which contains a code representation of the success values of the input code elements for that state. That code representation typically comprises a series of ordered indexing bits which correspond to the respective possible values of the input code elements, with set bits designating the success values of those code elements for the particular state.

The state word also typically contains a number, referred to as a base state number, which is an identification of one of the possible success states. The other success states are assigned identities ordered in accordance with the order of the corresponding indexing bits. The success states are typically identified by a set of consecutive numbers with the base state number at one end of the set.

Upon comparison of an input code element with the set indexing bits of the state word, if the code element value matches one of the set bits, the required success state identification corresponding to that match is derived from the position of the matched bit among the set bits. More specifically, in preferred form of the invention, an index is derived which equals the number of set indexing bits which lie to one side of the matched bit. The proper success state is then identified by the sum of the index and the base state number. Thus the control table entry for each decision state, in contrast to the prior art, is not required to store explicit identities of all the possible success states to which transition may be made from that state.

BRIEF DESCRIPTION OF THE DRAWINGS

A full understanding of the invention will be had from the following description, which is to be read with reference to the accompanying drawings, in which.

DESCRIPTION OF A PREFERRED EMBODIMENT OF THE INVENTION

Figure 1:
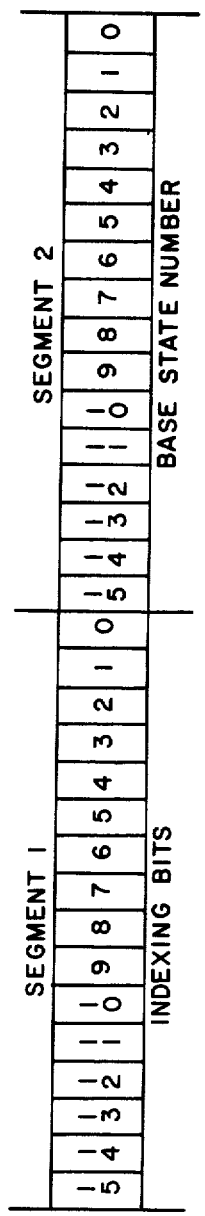
FIG. 1 is a schematic diagram representing a preferred format for a state word.

The invention involves an FSA which has a state control table memory containing only one entry, or state word, associated with each multiple exit decision state. Each state word has two parts, as shown in FIG. 1: a set of indexing bits and a base state number.

The set of indexing bits includes one bit corresponding to each possible value of an input code element. In the example of FIG. 1 the input code is assumed to comprise code elements of 4 bits each; hence there are 16 indexing bits for the 16 possible different combinations of 4 bits. A 3-bit input code would require 8 indexing bits; a 5-bit code would require 32 bits, etc.

Because of industry formating standards, a 16-bit set of indexing bits is most appropriate. Thus, an 8-bit input character can be separated into two 4-bit nibbles, and processed sequentially as two successive input code elements. More generally, the stream of input code elements may represent a series of patterns, such as text characters, for example, with each pattern represented by a plurality of code elements each of which includes more than one code bit. The input code elements of a series representing any one bit pattern are then typically processed sequentially, with the FSA making success transitions through a series of decision states, one for each code element or nibble. Due to the nature of conventional codes, the decision state for at least one of the nibbles ordinarily must have associated with it a plurality of alternative success states.

The success values of the input code elements are designated by set index bits, typically having the bit value one. Thus, if a binary one is stored in a specific indexing bit position corresponding to a particular value of the incoming (4-bit) code element, a success transition is made; conversely a zero in the bit position is a default, and the transition must be determined by some type of default mechanism. See, for example, default register 107, described below.

The base state number is stored in the state word along with the indexing bits, and identifies explicitly the first state of a set of success states which are identified by consecutive numbers. There is one such success state for every possible success value of the input code element, i.e. a success state for every one-bit within the indexing bits.

The specific success state to which a transition is made, chosen from the set of consecutive states in response to a given input code element, is determined by adding to the base state number an index generated from the indexing bits and the input code. Specifically, the index is equal to the number of binary ones from among the indexing bits which lie to one side (either left or right can be arbitrarily implemented) of the bit which corresponds to the value of the current input code element.

Figure 2:
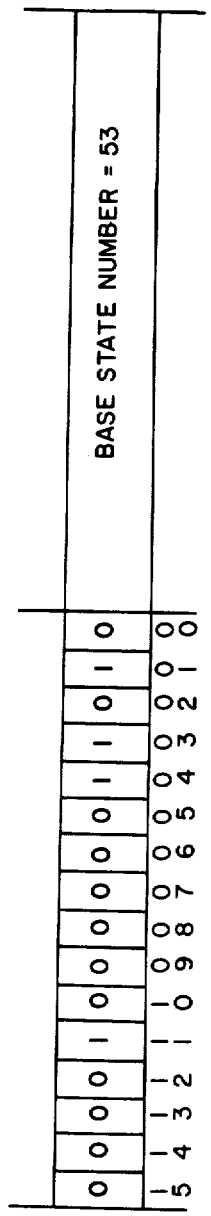
FIG. 2 comprises a schematic diagram representing a specific state word format for a state from which multiple success transitions are possible, and a state diagram representing the corresponding alternative success transitions from that state.
Figure 2:
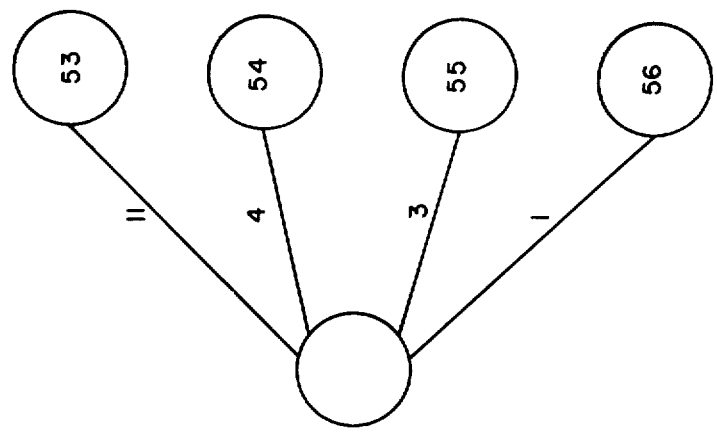

FIG. 2 serves as an example. Four indexing bits are assumed to be equal to one, the bits numbered 1, 3, 4, and 11; the base state number is assumed to be 53. Assuming the implementation is such that one-bits to the left of the match bit are counted, it can be seen that (for example) the index for an input code element value corresponding to bit number 3 is 2 (there are 2 one-bits to the left of the number 3 bit). The next state identity is therefore 53+2=55. In a similar manner, the index for bit 11 is zero, for bit 4 it is one, and for bit 1 it is three, leading to the respective next state identities 53, 54 and 56. If the initial state and the success transitions represented in FIG. 2 are associated with detection of a character, or of the first nibble of a character, which is the common initial character of four different query words, for example, the four success states 53 to 56 may be similarly associated with the respective second characters, or second nibbles, of those words. Thus, one or more of the success states shown may also comprise multiple exit decision states associated with state words and state diagrams similar to those shown.

Figure 3:
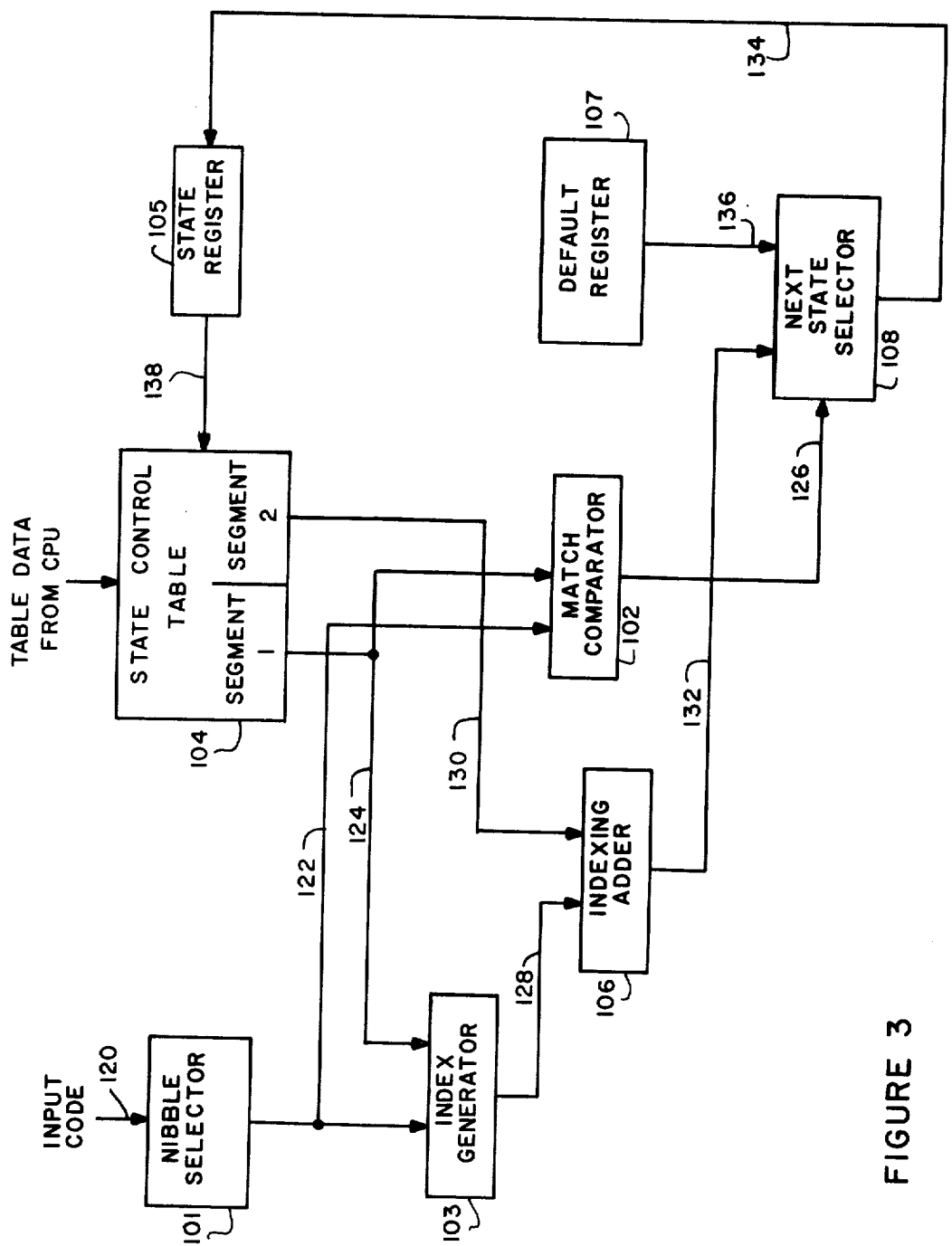
FIG. 3, is a block diagram representing an FSA embodying the invention.

FIG. 3 is a block diagram of one possible implementation of the invention. An input code is received from the line 120 and is separated into nibbles by the nibble selector 101. Each such nibble is presented as a 4-bit code via the line 122 to both the match comparator 102 and the index generator 103. The other input to each of these elements, supplied via the line 124, is a set of indexing bits derived from the state control table memory 104. That memory is loaded with data from a central processing unit, not explicitly shown, and contains a state word for each possible state. Each state word for a multiple exit decision state includes a first segment comprising a set of indexing bits with set bits representing success code element values for that particular state, and includes a second segment comprising a base state number which explicitly identifies the next success state corresponding to one of those success values.

The state register 105 contains the value of the current state, received via the line 134 as described below. The state register supplies that state value via the line 138 to state control table memory 104, causing the memory to deliver as output the state word for the current state. The first segment of that state word is supplied over line 124 to match comparator 102 and to index generator 103 as already stated; and the second segment is supplied via the line 130 to the match comparator and to the indexing adder 106. Match comparator 102 compares the incoming code nibble from line 122 and the set indexing bits from line 124, supplying an output signal on the line 126 when a match is detected.

The index generator 103 generates an index from the indexing bits from line 124 and the incoming nibble from line 122 in the manner previously described. The resulting index is supplied via the line 128 to the indexing adder 106, which adds together the index and the base state number obtained via the line 130 from segment 2 of the state word from the control table memory 104. The resulting sum of the index and the base state number, representing the identity of the success state that corresponds to the input code element just received, is supplied via the line 132 to the next state selector 108.

If there is a match of the incoming nibble to a set index bit of the state word, the next state selector 108 receives a match signal on line 126, and selects the output of the indexing adder 106 as the identity of the next state, and supplies that data via the line 134 as input to the state register 105; if there is no match, the next state is chosen by next state selector 108 via the line 136 from the default register 107, whose contents have previously been set by another means. The resulting change in the contents of state register 105 causes a corresponding change in the state word being read from state control table memory 104, and thus effectively shifts the FSA to the appropriate next state.

Figure 4:
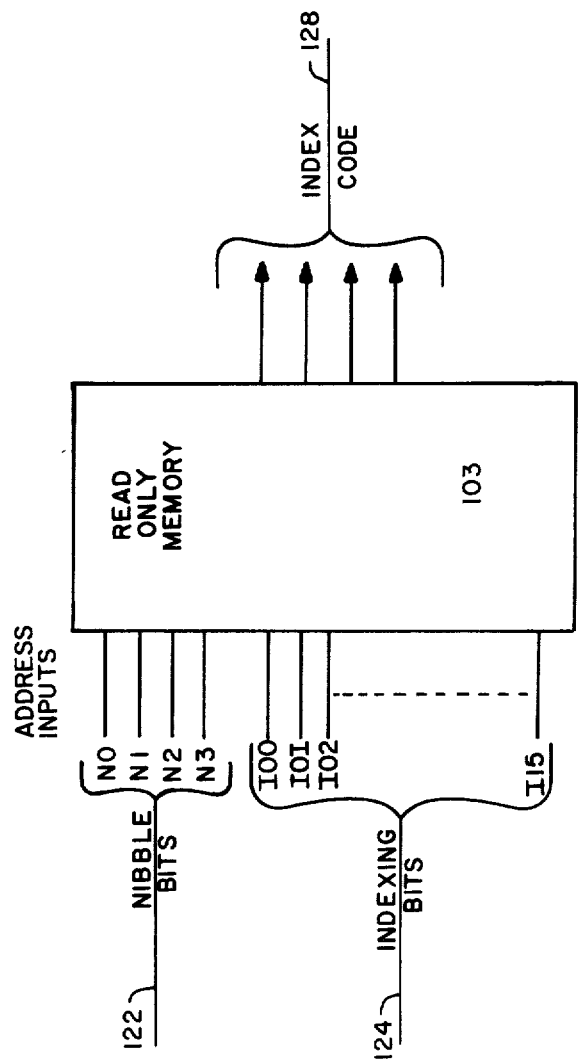
FIG. 4 is a diagram representing a Read-Only-Memory for generating an index to be added to the base state number.

There are a number of possible methods of implementing the index generator. One possible means is the use of Read-Only-Memory (ROM). As shown in FIG. 4, the address inputs to the ROM include the 4-bit nibble signals from line 122 and the 16 indexing bits from line 124. The output of the ROM is typically a 4-bit code representing the index, and is supplied via the line 128 to indexing adder 106. Thus, the ROM typically comprises a system of permanent selective connections between the 20 address inputs and the four code outputs such that, for every possible combination of the address inputs, the output code represents the particular index value that corresponds to that combination.

The following is a table giving some sample code outputs from the ROM of FIG. 4 as a function of the nibble and indexing bit address inputs. The first five rows of the table assume an input nibble corresponding to indexing bit number zero, and illustrate that the index then does not depend upon the value of that zero bit, but only upon the number of one-bits to its left. The rest of the table illustrates the maximum possible index for each of seven illustrative values of the input nibble.

input character, and (3) the next state output. The next state output is an indication of whether the text starting from the beginning of the section and ending with the current input character is recognized as satisfying the query . . .

To cut down on the length of the list of transitions, certain characters are distinguished as significant for each state; the others share a default transition. In most states, only a few characters will be significant.

. . . During the search, the transition for the current character must be located among the set of transitions from the current state. This is done, in the table format described below, with a binary search among the significant characters with respect to the eight-bit unsigned value of the current character. Failure of this search causes the default transition to be taken.

For example, suppose state 1 has a transition to itself when the input is any letter, to state 2 on a blank, and to state 3 on any other input character . . . The list of transitions from state 1 is [then:]

| FROM STATE | ON INPUT | TO STATE |
|---|---|---|
| 1 | [x'00',blank) | 3 |
| 1 | blank | 2 |
| 1 | (blank,A) | 3 |
| 1 | A | 1 |
| 1 | (A,Z) | 1 |
| 1 | Z | 1 |
| 1 | (Z,x'FF'] | 3 |

The table generator identifies the intervals of characters (considered as eight-bit unsigned binary numbers) caus-

| Nibble | | | | Indexing Bits | | | | | | | | | | | | | | | | Index | No. |
|--|--|--|--|--|--|--|--|--|--|--|--|--|--|--|--|--|--|--|--|--|--|
| N3 | N2 | N1 | N0 | 15 | 14 | 13 | 12 | 11 | 10 | 09 | 08 | 07 | 06 | 05 | 04 | 03 | 02 | 01 | 00 | Code | 1's |
| 0 | 0 | 0 | 0 | 0 | 0 | 0 | 0 | 0 | 0 | 0 | 0 | 0 | 0 | 0 | 0 | 0 | 0 | 0 | x | 0000 | 0 |
| 0 | 0 | 0 | 0 | 0 | 0 | 0 | 0 | 0 | 0 | 0 | 0 | 0 | 0 | 0 | 0 | 0 | 0 | 1 | x | 0001 | 1 |
| 0 | 0 | 0 | 0 | 0 | 0 | 0 | 0 | 0 | 0 | 0 | 0 | 0 | 0 | 0 | 0 | 1 | 0 | 0 | x | 0001 | 1 |
| 0 | 0 | 0 | 0 | 0 | 0 | 0 | 0 | 0 | 0 | 0 | 0 | 0 | 0 | 0 | 0 | 1 | 1 | 1 | x | 0010 | 2 |
| 0 | 0 | 0 | 0 | 0 | 0 | 0 | 0 | 0 | 0 | 0 | 0 | 0 | 0 | 0 | 1 | 0 | 0 | 0 | x | 0001 | 1 |
| 0 | 0 | 0 | 0 | 1 | 1 | 1 | 1 | 1 | 1 | 1 | 1 | 1 | 1 | 1 | 1 | 1 | 1 | 1 | x | 1111 | 15 |
| 0 | 0 | 0 | 1 | 1 | 1 | 1 | 1 | 1 | 1 | 1 | 1 | 1 | 1 | 1 | 1 | 1 | 1 | x | x | 1110 | 14 |
| 0 | 0 | 1 | 0 | 1 | 1 | 1 | 1 | 1 | 1 | 1 | 1 | 1 | 1 | 1 | 1 | 1 | x | x | x | 1101 | 13 |
| 0 | 0 | 1 | 1 | 1 | 1 | 1 | 1 | 1 | 1 | 1 | 1 | 1 | 1 | 1 | 1 | x | x | x | x | 1100 | 12 |
| 0 | 1 | 0 | 0 | 1 | 1 | 1 | 1 | 1 | 1 | 1 | 1 | 1 | 1 | 1 | x | x | x | x | x | 1011 | 11 |
| 1 | 1 | 1 | 0 | 1 | x | x | x | x | x | x | x | x | x | x | x | x | x | x | x | 0001 | — |
| 1 | 1 | 1 | 1 | x | x | x | x | x | x | x | x | x | x | x | x | x | x | x | x | 0000 | 0 | x - means don't care; i.e. either 1 or 0

APPENDIX

The following passages and tables from the above identified article by Bullen et al are relied upon by the present applicants as background information with respect to the claimed invention:

A finite state approach to character string searching . . . is accomplished by first transforming the search request into a table using a software routine. The actual search is then performed on each section of text by a very simple microprogrammed algorithm which operates on the text, the table, and a register holding the "state" of the search . . . The search passes through the text section from beginning to end, using each successive character to transform the state by consulting the table. At the end of the section, the output of the resulting state indicates whether or not the section satisfies the search request . . .

The state graph is produced in the form of a list of transitions from each state. A transition comprises (1) an input character, (2) the next state after reading that ing each transition. It produces a list . . . [in which the] isolated characters . . . are the ones against which the input character is compared in the binary search for the proper transition . . .

The table section for a given state can be written directly from the binary search tree . . . [T]he layout of the section of the table for the sample state discussed above [is shown by:]

| | DISPLACEMENTS | | ADDRESS OF | |
|---|---|---|---|---|
| | SMAL- | GREAT- | TABLE | NEXT |
| CHAR- | LER | ER | SECTION FOR | STATE |
| ACTER | LINK | LINK | NEXT STATE | OUTPUT |
| A | 1 | 2 | addr(1) | 0 |
| blank | 2 | 2 | addr(2) | 1 |
| Z | 0 | 1 | addr(1) | 0 |
| — | 0 | 0 | addr(3) | 0 |

... The internal format of a table entry, with bit addresses for each field, is shown below.

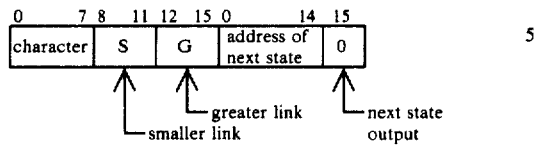

... [T]he firmware search algorithm which accesses the above table format ... has three inputs, as previously mentioned: the text section, the table, and the 16-bit current state value, which is maintained in a microregister during the search. The operation of the algorithm is quite straightforward. Note that the algorithm can terminate in either of two ways: (1) if the input is exhausted before a state is encountered with an output of one, or (2) if a state with an output of one is encountered first ...

We claim:

1. A finite state automaton (FSA) responsive to a stream of input code elements, each code element consisting of a predetermined plurality of code bits, for searching the stream simultaneously for a plurality of specified query patterns each of which comprises an ordered plurality of code element query values; the FSA making transition in response to each input code element from one to another of a plurality of alternative states which include at least one multiple exit decision state in which the FSA searches simultaneously for a plurality of specified alternative code element query values that are code element values of respective query patterns; each code element query value being associated with a distinct next state to which the FSA makes transition in response to detection of that code element query value in the input stream; said FSA comprising input means for receiving an input stream of digital code data and for successively accessing from the stream a current one of said code elements for parallel delivery, control memory means including a plurality of state words associated with respective alternative states of the FSA, the state word associated with each said decision state including a series of ordered indexing bits corresponding to the respective possible values of said input code elements, with set bits designating said plurality of specified code element query values, and a code representation of a base state number having a predetermined relation to the next success state associated with a selected one of those query values, state register means for storing an identification of the current state and for accessing the contents of the state word associated with that state, action means controlled successively by the currently accessed input code element and by the currently accessed contents of the state word and including, when under control of the state word contents associated with said multiple exit decision state, means for simultaneously comparing said accessed input code element value and the set indexing bits in said accessed state word contents and for developing a match signal in response to detection of a match, means for deriving an index that represents the position among the set indexing bits of the bit corresponding to the input code element value, means for developing from said index and from the base state number represented in said accessed state word contents an identification of the next success state associated with the current input code element value, and means responsive to said match signal for storing the so developed next success state identification in said state register means as an identification of the next current state of the FSA.

2. In operation of a finite state automation (FSA) for searching an input stream of digital code elements for a plurality of specified code element query values, the FSA making transition in response to each input code element from one to another of a plurality of alternative states which include at least one multiple exit decision state, each code element query value being associated with a distinct next success state to which the FSA makes transition from said decision state in response to detection of that code element query value in the input stream; the method of controlling such transition, comprising providing a state memory means associated with said decision state, storing in said memory means an ordered series of code bits which correspond to the respective possible values of each input code element and are selectively set to designate said query values, assigning to said next success states correspondingly ordered next state identities, storing in said memory means a base state number representing the identity of the next success state associated with a selected one of said query values, electronically comparing the current input code element simultaneously to all of the set indexing bits, electronically deriving an index that represents the position among the set indexing bits of any indexing bit that matches the current input code element, deriving from said index and from said base state number an identification of the next success state associated with such indexing bit, and causing the FSA to make transition to the so identified next success state.

* * * * *